United States Patent
Liu (10) Patent No.: US 11,467,638 B2
(45) Date of Patent: Oct. 11, 2022

(54) WATER-COOLING HEAD ADJUSTMENT STRUCTURE FOR COMPUTER WATER COOLING

(71) Applicant: AMERICAN FUTURE TECHNOLOGY, City of Industry, CA (US)

(72) Inventor: You-Chi Liu, City of Industry, CA (US)

(73) Assignee: AMERICAN FUTURE TECHNOLOGY, City Of Industry, CA (US)

( * ) Notice: Subject to any disclaimer, the term of this patent is extended or adjusted under 35 U.S.C. 154(b) by 53 days.

(21) Appl. No.: 17/091,901

(22) Filed: Nov. 6, 2020

(65) Prior Publication Data

US 2021/0263573 A1 Aug. 26, 2021

(30) Foreign Application Priority Data

Feb. 24, 2020 (TW) ................................ 109105895

(51) Int. Cl.
*G06F 1/20* (2006.01)

(52) U.S. Cl.
CPC .......... *G06F 1/20* (2013.01); *G06F 2200/201* (2013.01)

(58) Field of Classification Search
CPC . G06F 1/20; G06F 2200/201; H05K 7/20327; H05K 7/20772; H05K 7/20; H05K 7/781; H05K 7/20809; H05K 7/20818
See application file for complete search history.

(56) References Cited

U.S. PATENT DOCUMENTS

| | | | | |
|---|---|---|---|---|
| 2007/0047203 A1* | 3/2007 | Chen | ........................ | G06F 1/20 361/698 |
| 2007/0070600 A1* | 3/2007 | Tomioka | ............. | F28D 15/0266 361/688 |
| 2007/0285899 A1* | 12/2007 | Cheng | ....................... | G06F 1/20 361/709 |
| 2008/0006037 A1* | 1/2008 | Scott | ..................... | H01L 23/473 257/E23.098 |
| 2009/0100852 A1* | 4/2009 | Wang | ....................... | G06F 1/20 62/259.2 |
| 2009/0272144 A1* | 11/2009 | Lin | ........................... | G06F 1/20 62/498 |

(Continued)

*Primary Examiner* — Stephen S Sul
*Assistant Examiner* — Alexander Ryan Horton
(74) *Attorney, Agent, or Firm* — Muncy, Geissler, Olds & Lowe, P.C.

(57) ABSTRACT

A water-cooling head adjustment structure for computer water cooling includes a water-cooling head attached to a heating element of a circuit board, a water-cooling head adapter including a bottom panel attached to the water-cooling head, a hollow frame located on the bottom panel and a cover plate covering the hollow frame and equipped with two water inlet and outlet connectors, a steering adapter having two water pipes connected to a water cooling row connector of a water cooling row and two connection pipes respectively connected to the water inlet and outlet connectors of the water-cooling head adapter, and a one-dimensional movement adjustment mechanism provided between the cover plate and the hollow frame for adjustment of the relative position between the cover plate and the hollow frame to align the connection pipes and the water inlet and outlet connectors.

5 Claims, 7 Drawing Sheets

(56) References Cited

U.S. PATENT DOCUMENTS

2009/0308796 A1\* 12/2009 Ham .................. F16K 11/0743
                                                                                             210/110
2018/0299931 A1\* 10/2018 Li ..................... H05K 7/20263

\* cited by examiner

WATER-COOLING HEAD ADJUSTMENT STRUCTURE FOR COMPUTER WATER COOLING

This application claims the priority benefit of Taiwan patent application number 109105895, filed on Feb. 24, 2020.

BACKGROUND OF THE INVENTION

1. Field of the Invention

The present invention relates to water cooling technology and more particularly, to a water-cooling head adjustment structure for computer water cooling, which uses a water-cooling head adjustment structure formed of one-dimensional movement adjustment mechanism to solve the problem of the prior art design of water cooling mechanism that cannot fit different computer mainframes because the position of the water pipes connected between the water-cooling head adapter and the water cooling row connector may be different due to that the relative position of the central processing unit (CPU) of different motherboards is slightly different.

2. Description of the Related Art

The cooling method of the computer is roughly divided into air cooling system and water cooling system. The air-cooling method uses multiple fans to suck in cold air from the outside of the computer into the computer. The gas flow channel is designed to dissipate heat-prone components (such as: central processing units, graphics processing units, access devices, interface cards and power components), and then hot air that has risen in temperature is also exhausted from the computer by a fan to complete air cooling and heat dissipation. The air cooling system has the advantages of simple structure and lower cost, but its disadvantage is that the heat dissipation effect is relatively general and it is easy to accumulate a lot of dust inside the computer. In contrast, the water cooling system has the advantage of heat dissipation. The method is to install a water-cooling head on the heating element. The water-cooling head is equipped with radiating fins and a water-cooling fluid flow channel. The water-cooling fluid in the water-cooling head is used to absorb the heat of the heating element, and the water pump connected to the water-cooling head is used to pump the water-cooling fluid to flow into a water pipe. Then, the water pipe transports the water-cooled fluid with heat to a water cooling row with radiating fins and a fan for air cooling. The cooled water-cooling fluid is sent back to the water-cooling head by another water pipe to complete the heat The above-mentioned water-cooling circulation cooling system has the advantage of high-efficiency heat dissipation, so it is widely used in the e-sports industry or other industries that require high-performance computers or servers. However, the size of the space for installing the water-cooling kit inside each computer is different, and the locking point provided by the computer for the water-cooling kit is not a fixed position. Therefore, when the water-cooling head is fixed on the heating element and the water cooling row is fixed on the computer case, the position of the water pipes connected between the water-cooling head adapter and the water cooling row connector may be different due to that the relative position of the central processing unit (CPU) of different motherboards is slightly different. Therefore, water pipes with fixed length and spacing have problems that cannot be smoothly connected. This problem needs to be solved by those engaged in this industry.

SUMMARY OF THE INVENTION

The present invention has been accomplished under the circumstances in view. It is therefore the main object of the present invention to provide a water-cooling head adjustment structure for computer water cooling, which comprises a computer mainframe with an accommodation space defined therein and a water cooling mechanism mounted in the accommodation space of the computer mainframe and filled with a water cooling fluid for carrying thermal energy. The water cooling mechanism comprises a water-cooling head having a bottom surface thereof attached to a top surface of a heating element of a circuit board, a water-cooling head adapter comprising a bottom panel attached to an opposing top surface of the water-cooling head, a hollow frame located on a top wall of the bottom panel and a cover plate covering the hollow frame and equipped with two water inlet and outlet connectors at a top side thereof, a steering adapter comprising two water pipes extended from one lateral side thereof and connected to a water cooling row connector of a water cooling row and two connection pipes extended from a bottom side thereof and respectively connected to the water inlet and outlet connectors of the water-cooling head adapter, and a one-dimensional movement adjustment mechanism provided between the cover plate and the hollow frame for adjustment of the relative position between the cover plate and the hollow frame to align the connection pipes and the water inlet and outlet connectors. With the aforementioned structure, the invention solves the problem of the prior art design of water cooling mechanism that cannot fit different computer mainframes because the position of the water pipes connected between the water-cooling head adapter and the water cooling row connector may be different due to that the relative position of the central processing unit (CPU) of different motherboards is slightly different.

Preferably, the one-dimensional movement adjustment mechanism comprises a plurality of first adjustment holes located on the cover plate, a plurality of second adjustment holes located on the hollow frame corresponding to the first adjustment holes and having an aperture smaller than the first adjustment holes, an annular abutment portion formed on an outer edge of each of the second adjustment holes, and a plurality of fastening members respectively mounted in the first adjustment holes and the respective second adjustment holes and fixed on the respective annular abutment portions around the respective second adjustment holes.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Referring to FIGS. 1-4, a water-cooling head adjustment structure for computer water cooling comprises a computer mainframe 1 and a water cooling mechanism 2. The water cooling mechanism 2 is mounted in an accommodation space 10 of the computer mainframe 1. The water cooling mechanism 2 is equipped with a water cooling fluid (not shown), which can carry thermal energy. The water cooling fluid refers to a water cooling fluid with anti-corrosion and antibacterial properties. The water cooling mechanism 2 comprises a water-cooling head 21, a water-cooling head adapter 22 and a steering adapter 23.

The water-cooling head 21 has a bottom surface thereof attached to a top surface of a heating element 111 of a circuit board 11. The heating element 111 refers to the central processing unit (CPU).

The water-cooling head adapter 22 comprises a bottom panel 222 affixed to an opposing top surface of the water-cooling head 21, a hollow frame 223 located on a top wall of the bottom panel 222, and a cover plate 224 covering the hollow frame 223. There is a one-dimensional (referring to the X-axis or Y-axis direction) movement adjustment mechanism between the cover plate 224 and the hollow frame 223. The cover plate 224 has an opposing top wall thereof provided with two water inlet and outlet connectors 221.

Figure 3:
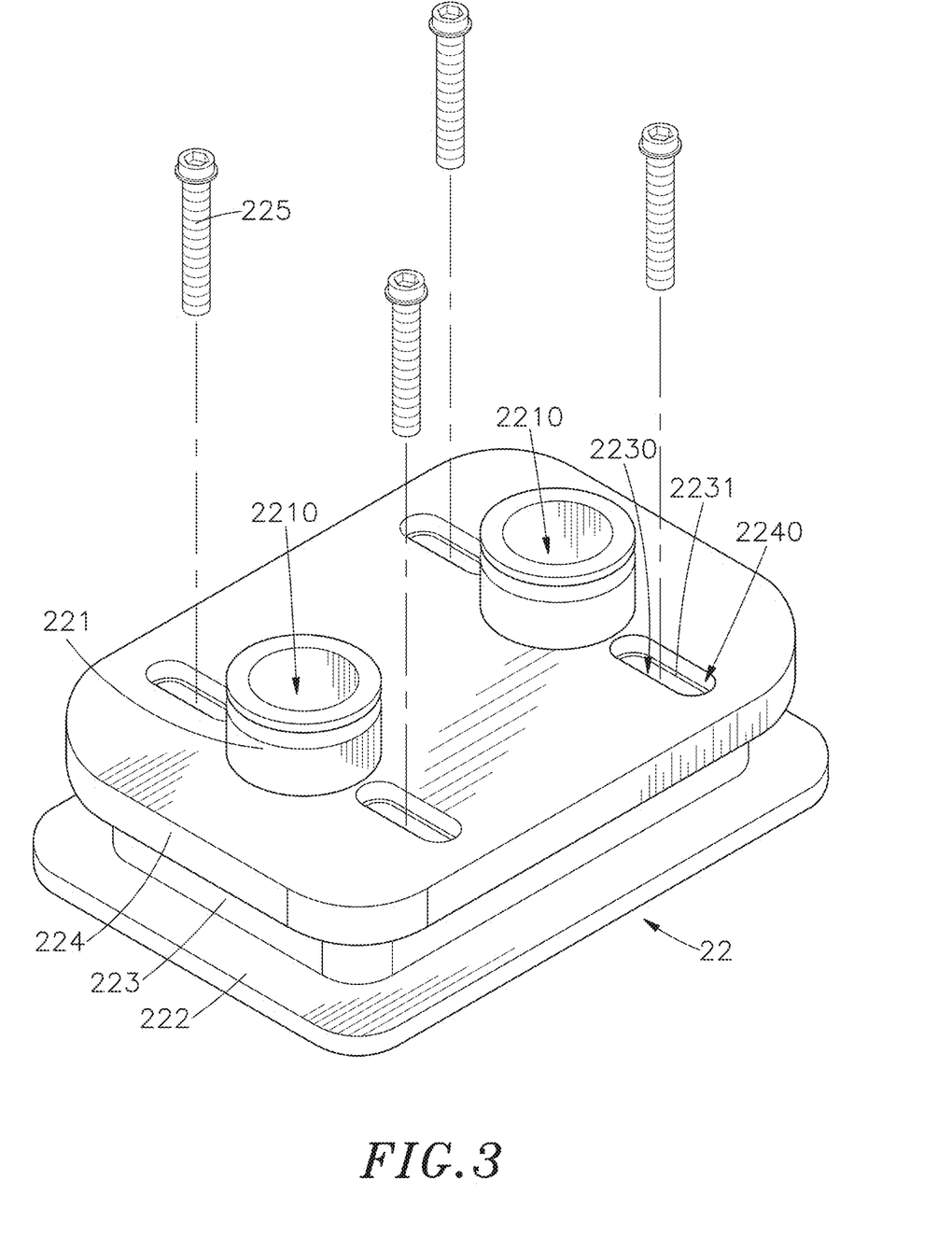
FIG. 3 is an exploded view of the water-cooling head adapter.
Figure 4:
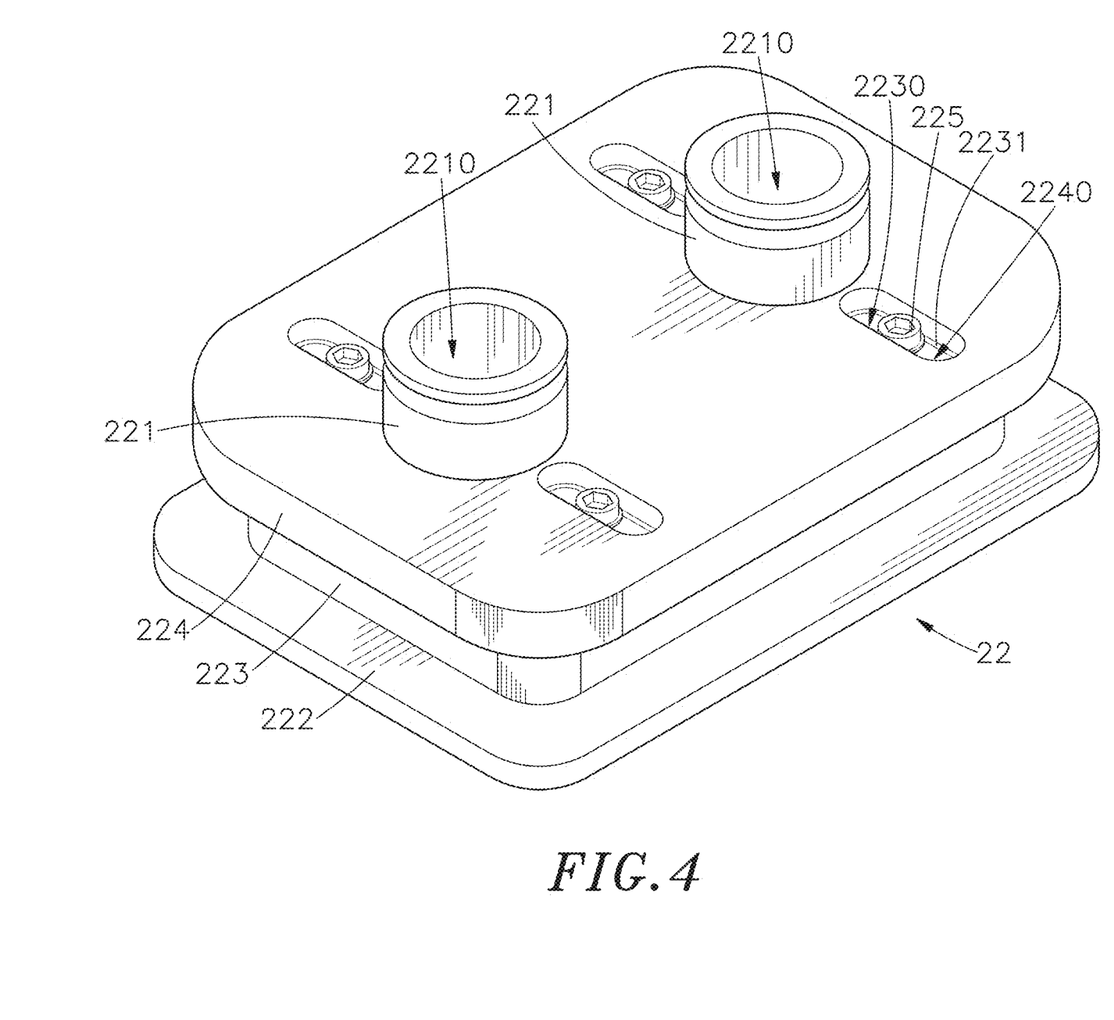
FIG. 4 is an oblique top elevational view of the water-cooling head adapter.

The cover plate 224 of the water-cooling head adapter 22 is provided with a plurality of first adjustment holes 2240. The hollow frame 223 is provided a plurality of second adjustment holes 2230 whose apertures are smaller than the first adjustment holes 2240, so that when the first adjustment holes 2240 and the second adjustment holes 223 are aligned, the outer edge of each of the second adjustment holes 2230 is formed with an annular abutment portion 2231. The water-cooling head adapter 22 further comprises a plurality of fastening members 225 respectively mounted in the first adjustment holes 2240 and the respective second adjustment holes 2230 and fixed on the respective annular abutment portions 2231.

Figure 1:
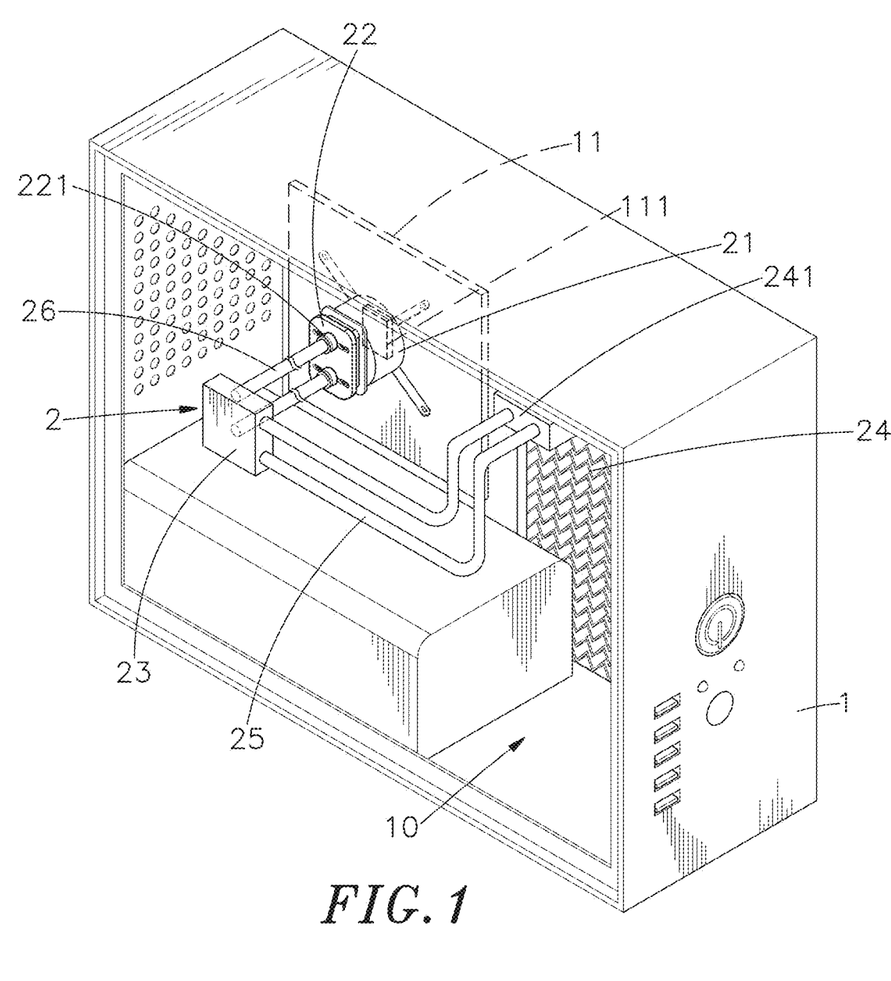
FIG. 1 is an oblique top elevational view of a water-cooling head adjustment structure for computer water cooling in accordance with the present invention.
Figure 2:
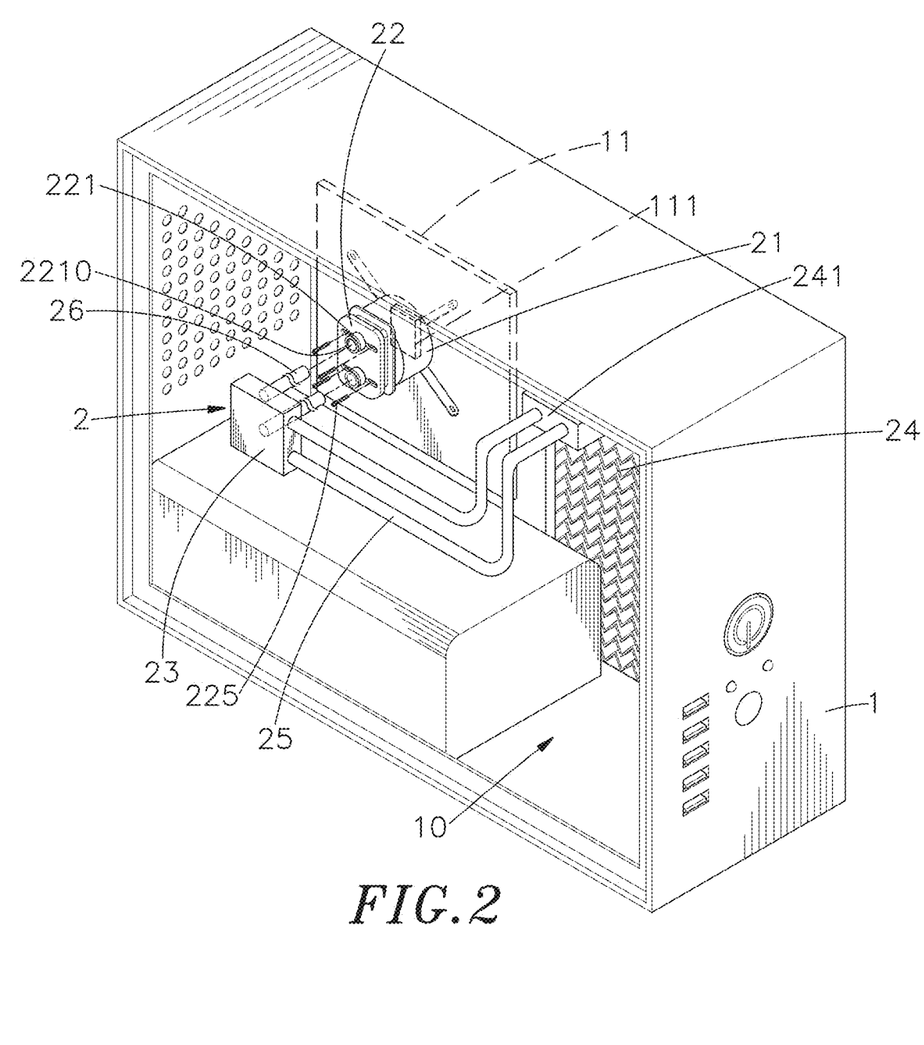
FIG. 2 is an exploded view of the water-cooling head adjustment structure for computer water cooling in accordance with the present invention.

The steering adapter 23 has two water pipes 25 extended from one lateral side thereof and connected to a water cooling row connector 241 of a water cooling row 24, and two connection pipes 26 extended from a bottom side thereof and respectively connected to the two water inlet and outlet connectors 221 of the water-cooling head adapter 22. The cover plate 224 of the water-cooling head adapter 22 uses the one-dimensional direction moving mechanism to adjust the alignment between the two connection pipes 26 and the two water inlet and outlet connectors 221.

The angle between the two water pipes 25 and the two connection pipes 26 of the steering adapter 23 is between 60° and 120°. Although the angle between the two water pipes 25 and the two connection pipes 26 of the steering adapter 23 shown in the drawing is close to 90°, in order to meet the space utilization requirements in the accommodation space 10 of the computer mainframe 1, the angle range is set between 60° and 120°, which is reasonable configuration requirement.

The water pipes 25 and the connection pipes 26 refer to hollow water pipes made of glass or copper material.

Figure 5:
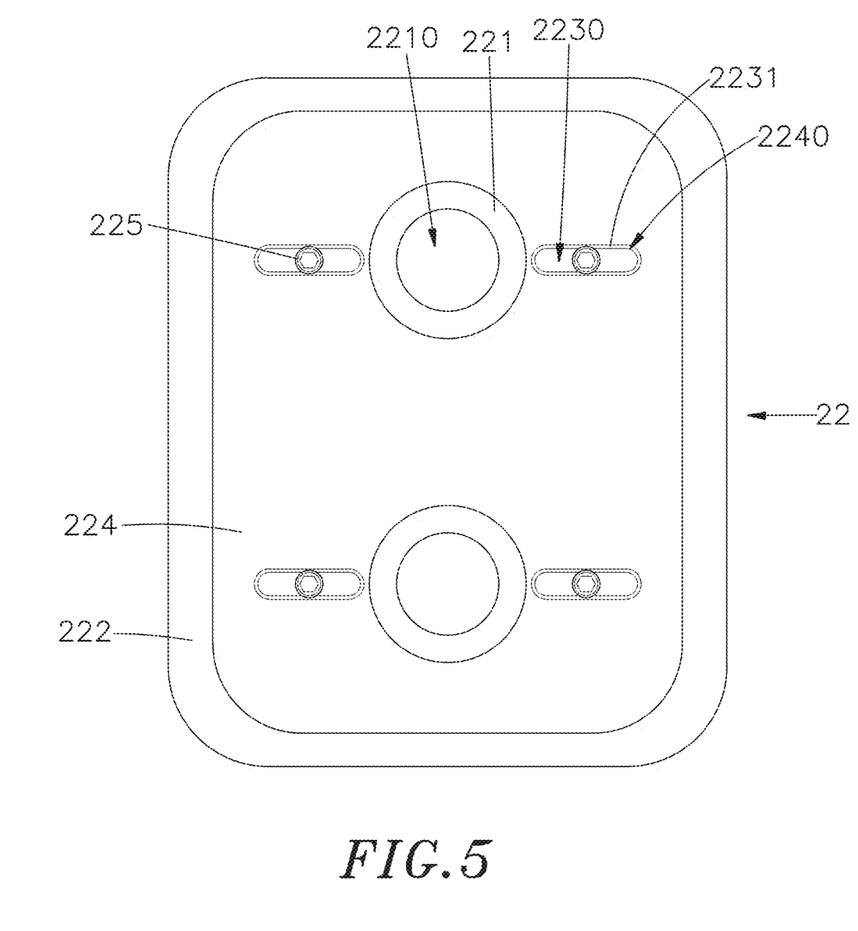
FIG. 5 is a schematic top view of the present invention, showing the cover plate of the water-cooling head adapter moved to the first position.
Figure 6:
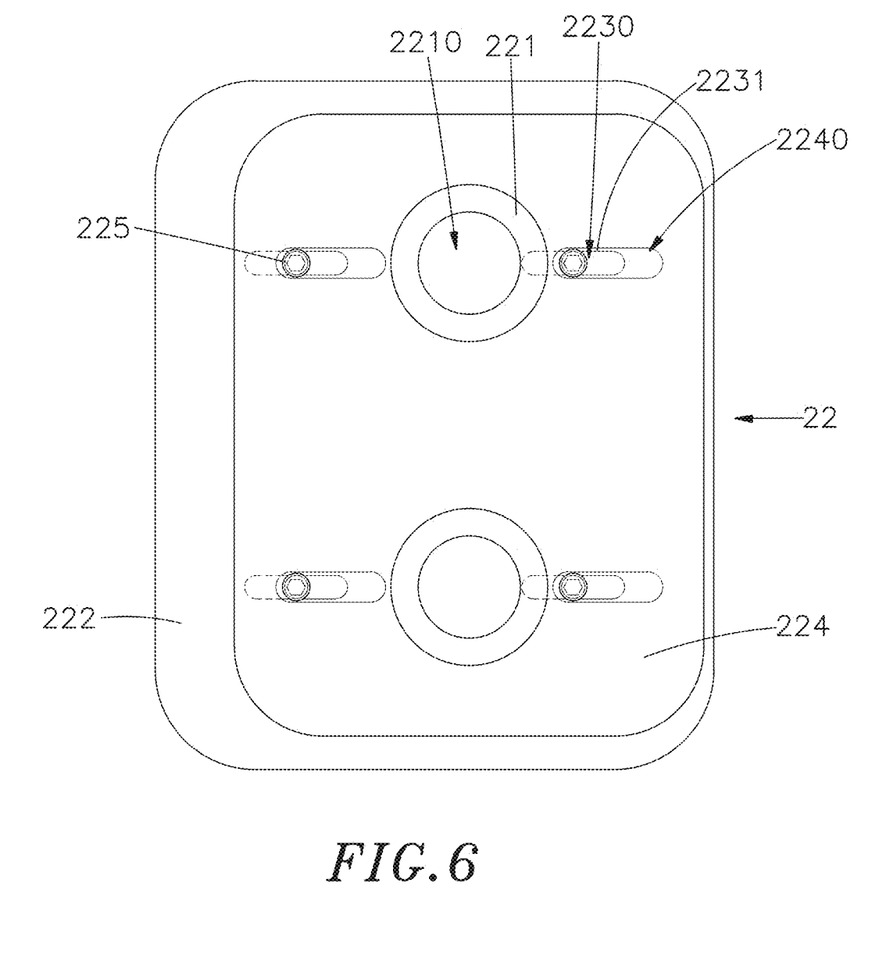
FIG. 6 is a schematic top view of the present invention, showing the cover plate of the water-cooling head adapter moved to the second position.
Figure 7:
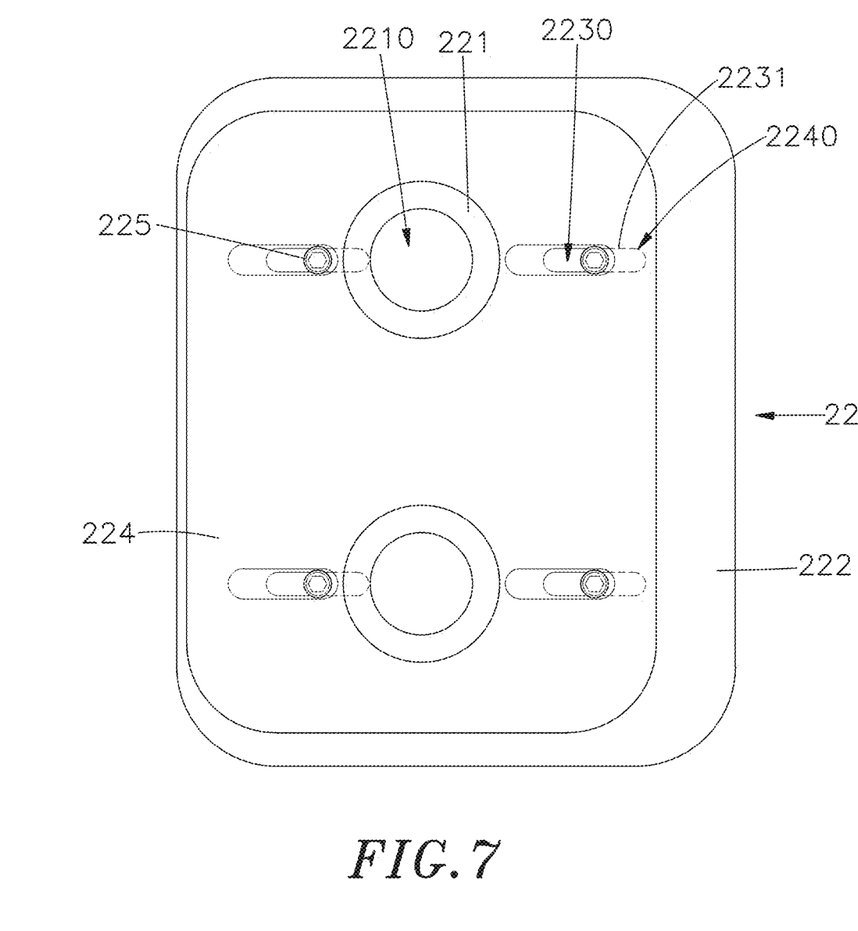
FIG. 7 is a schematic top view of the present invention, showing the cover plate of the water-cooling head adapter moved to the third position.

Referring to FIGS. 5-7, schematic top views of the cover plate of the water-cooling head adapter moved to the first, second and third positions are shown. It discloses the position adjustment of the one-directional direction moving mechanism of the water-cooling head adapter 22. In order to fit the alignment between the connection pipes 26 of the steering adapter 23 and the water inlet and outlet connectors 221 of the water-cooling head adapter 22, the cover plate 224 is moved in the X-axis direction relative to the hollow frame 223 and the bottom panel 222, so that the fastening members 225 can be respectively mounted in the first adjustment holes 2240 of the cover plate 224 and the second adjustment holes 2230 of the hollow frame 223 and fixed on the respective annular abutment portions 2231. FIG. 5 reveals that the fastening members 225 are locked to the annular abutment portions 2231 at the center of the first adjustment holes 2240 and the second adjustment holes 2230. At this time, the cover plate 224 and the two water inlet and outlet connectors 221 are located in the center of the water-cooling head adapter 22. FIG. 6 reveals that the cover plate 224 and the two water inlet and outlet connectors 221 are moved to the right relative to the position shown in FIG. 5 to fit the rightward-biased connection pipes 26 of the steering adapter 23 for installation. At this time, the fastening members 225 are locked to the annular abutment portions 2231 relative to the left side of the first adjustment holes 2240, and the bottom ends of the fastening members 225 are still located in the center of the second adjustment holes 2230. FIG. 7 reveals that the cover plate 224 and the two water inlet and outlet connectors 221 are moved to the left relative to the position shown in FIG. 5 to fit the leftward-biased connection pipes 26 of the steering adapter 23 for installation. At this time, the fastening members 225 are locked to the annular abutment portions 2231 relative to the right side of the first adjustment holes 2240, and the bottom ends of the fastening members 225 are still located in the center of the second adjustment holes 2230. Through the foregoing disclosure, a one-dimensional movement adjustment mechanism is achieved. Although the foregoing disclosure is the movement adjustment in the X-axis direction, those skilled in this art can also make simple structural or directional changes to form the movement adjustment in the Y-axis direction, which is also within the scope of the present invention.

The heat dissipation method of the water-cooling head adjustment structure for computer water cooling disclosed above is outlined hereinafter. The water-cooling head 21 is installed on the heating element 111. The water-cooling head 21 is equipped with radiating fins (not shown) and a water-cooling fluid flow channel (not shown). The water-cooling fluid in the water-cooling head 21 absorbs the heat of the heating element 111. The water pump (not shown) connected to the water-cooling head 21 pumps the water-cooling fluid to flow to the water-cooling head adapter 22. The water-cooling head adapter 22 transfers the water-cooling fluid to the steering adapter 23 through the connection pipe 26. The steering adapter 23 turns the water-cooling fluid to one of the water pipes 25. The water pipe 25 first transfers the water-cooling fluid with heat to the water cooling row connector 241, and then from the water cooling row connector 241 to the water cooling row 24 with radiating fins (not shown) and a fan (not shown) for air cooling. The cooled water-cooling fluid is sent back to the water-cooling head 21 through the other water pipe 25, the steering adapter 23, the connection pipes 26 and the water-cooling head adapter 22 to complete a heat dissipation of the water-cooling cycle.

According to the disclosure in FIGS. 1-7, it can be understood that the present invention is a water-cooling head adjustment structure for computer water cooling, which comprises a computer mainframe with an accommodation space defined therein, and a water cooling mechanism mounted in the accommodation space of the computer mainframe and filled with a water cooling fluid for carrying thermal energy. The water cooling mechanism comprises a water-cooling head having a bottom surface thereof attached to a top surface of a heating element of a circuit board; a water-cooling head adapter comprising a bottom panel attached to an opposing top surface of the water-cooling head, a hollow frame located on a top wall of the bottom panel, a cover plater covering the hollow frame and equipped with two water inlet and outlet connectors at a top side thereof, and a one-dimensional movement adjustment mechanism provided between the cover plate and the hollow frame; and a steering adapter having two water pipes extended from one lateral side thereof and connected to a water cooling row connector of a water cooling row and two connection pipes extended from a bottom side thereof and respectively connected to the water inlet and outlet connectors of the water-cooling head adapter. The cover plate of the water-cooling head adapter uses the one-dimensional movement adjustment mechanism to achieve alignment between the two connection pipes and the two water inlet and outlet connectors. With the aforementioned adjustment structure, the invention solves the problem of the prior art design of water cooling mechanism that cannot fit different computer mainframes because the position of the water pipes connected between the water-cooling head adapter and the water cooling row connector may be different due to that the relative position of the central processing unit (CPU) of different motherboards is slightly different. Therefore, the water cooling mechanism of the invention is applicable to a variety of computer mainframes. The solution provided by the present invention has excellent practicability in the field of solving the assembly of water cooling systems, so a patent application is filed to seek patent protection.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A water-cooling head adjustment structure for computer water cooling, comprising a computer mainframe with an accommodation space defined therein and a water cooling mechanism mounted in said accommodation space of said computer mainframe and filled with a water cooling fluid for carrying thermal energy, said water cooling mechanism comprising:
   a water-cooling head having a bottom surface thereof attached to a top surface of a heating element of a circuit board;
   a water-cooling head adapter comprising a bottom panel attached to an opposing top surface of said water-cooling head, a hollow frame located on a top wall of said bottom panel, and a cover plate covering said hollow frame and equipped with two water inlet and outlet connectors at a top side thereof;
   a steering adapter comprising two water pipes extended from one lateral side thereof and connected to a water cooling row connector of a water cooling row, and two connection pipes extended from a bottom side thereof and respectively connected to said two water inlet and outlet connectors of said water-cooling head adapter; and
   a one-dimensional movement adjustment mechanism provided between said cover plate and said hollow frame for adjustment of the relative position between said cover plate and said hollow frame to align said two connection pipes and said two water inlet and outlet connectors.

2. The water-cooling head adjustment structure for computer water cooling as claimed in claim 1, wherein a plurality of first adjustment holes located on said cover plate, a plurality of second adjustment holes located on said hollow frame corresponding to said plurality of first adjustment holes and having an aperture smaller than said plurality of first adjustment holes, an annular abutment portion formed on an outer edge of each of said plurality of second adjustment holes, and a plurality of fastening members respectively mounted in said plurality of first adjustment holes and the respective said plurality of second adjustment holes and fixed on the respective said annular abutment portions around the respective said plurality of second adjustment holes.

3. The water-cooling head adjustment structure for computer water cooling as claimed in claim 1, wherein an angle between said two water pipes and said two connection pipes of said steering adapter is between 60° and 120°.

4. The water-cooling head adjustment structure for computer water cooling as claimed in claim 1, wherein a connection structure of said two connection pipes and said two water inlet and outlet connectors is selectively arranged to position an outer pipe wall of each of said two connection pipes on an side wall of a joining cavity inside a respective said water inlet and outlet connector or to attach an inner pipe wall of each said connection pipe onto an outer wall of the respective said water inlet and outlet connector.

5. The water-cooling head adjustment structure for computer water cooling as claimed in claim 1, wherein said heating element is a central processing unit.

* * * * *